(12) United States Patent
Huang et al.

(10) Patent No.: US 9,273,230 B2
(45) Date of Patent: Mar. 1, 2016

(54) HOT MELT ASSIST WATERBORNE ADHESIVES AND USE THEREOF

(71) Applicant: Henkel IP & Holding GmbH, Duesseldorf (DE)

(72) Inventors: Tianjian Huang, Hillsborough, NJ (US); Kristina Thompson, Clinton, NJ (US); James Layser, Easton, PA (US); John Harrington, Ledgewood, NJ (US); John Meccia, Ringoes, NJ (US); Robert Mammarella, Greer, SC (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 303 days.

(21) Appl. No.: 13/804,230

(22) Filed: Mar. 14, 2013

(65) Prior Publication Data

US 2014/0141185 A1    May 22, 2014

Related U.S. Application Data

(60) Provisional application No. 61/727,375, filed on Nov. 16, 2012.

(51) Int. Cl.
*D06N 7/00* (2006.01)
*D06N 7/04* (2006.01)
(Continued)

(52) U.S. Cl.
CPC ... *C09J 5/08* (2013.01); *B32B 7/12* (2013.01); *B32B 29/005* (2013.01); *C09J 131/04* (2013.01); *B32B 2255/12* (2013.01); *B32B 2255/26* (2013.01); *B32B 2307/306* (2013.01); *B32B 2553/00* (2013.01); *C09J 2205/11* (2013.01); *C09J 2429/00* (2013.01);
(Continued)

(58) Field of Classification Search
CPC ........ C09J 5/08; C09J 131/04; C09J 2205/11; C09J 2429/00; C09J 2431/00; B32B 29/005; B32B 7/12; Y10T 428/254; Y10T 428/1303
USPC .......... 428/143, 144, 147, 323, 327; 442/417
See application file for complete search history.

(56) References Cited

U.S. PATENT DOCUMENTS 4,006,273 A    2/1977    Wolinski et al.
4,350,788 A    9/1982    Shimokawa et al.
(Continued)

FOREIGN PATENT DOCUMENTS

CA    2078476 A1    3/1993
CA    2145938 A1    10/1995
(Continued)

OTHER PUBLICATIONS

Popil, Roman E. et al. "Adhesive level effect on corrugated board strength—experiment and FE modeling." In: International progress in paper physics seminar. Oxford, Ohio: Miami University, 2006.

*Primary Examiner* — Michael C Miggins
(74) *Attorney, Agent, or Firm* — Sun Hee Lehmann

(57) ABSTRACT

A hot melt assist waterborne adhesive having high amplitude bead profile and higher heat resistance is provided. The hot melt assist waterborne adhesive includes an emulsion polymer, a preservative, a plurality of pre-expanded hollow microspheres and water. The hot melt assist waterborne adhesive is suitable as a partial or complete replacement to hot melt adhesives for use in converting paper and packaging process.

17 Claims, 3 Drawing Sheets

(51) Int. Cl.
*C09J 5/08* (2006.01)
*B32B 29/00* (2006.01)
*B32B 7/12* (2006.01)
*C09J 131/04* (2006.01)

(52) U.S. Cl.
CPC ....... *C09J 2431/00* (2013.01); *Y10T 428/1303* (2015.01); *Y10T 428/254* (2015.01)

(56) References Cited

U.S. PATENT DOCUMENTS

| | | |
|---|---|---|
| 5,264,467 A | 11/1993 | DiStefano |
| 5,356,683 A | 10/1994 | Egolf et al. |
| 6,139,961 A | 10/2000 | Blankenship et al. |
| 6,648,955 B1 | 11/2003 | Swiezkowski et al. |
| 6,740,373 B1 | 5/2004 | Swoboda et al. |
| 6,749,705 B2 | 6/2004 | Skryniarz et al. |
| 6,838,187 B2 | 1/2005 | Figiel et al. |
| 2002/0094403 A1 | 7/2002 | Ishikawa et al. |
| 2007/0155859 A1 | 7/2007 | Song et al. |
| 2007/0224395 A1 | 9/2007 | Rowitsch et al. |
| 2007/0287776 A1 | 12/2007 | Nordin et al. |
| 2008/0118693 A1 | 5/2008 | Bilski et al. |
| 2009/0280322 A1 | 11/2009 | Daniels |
| 2010/0012712 A1 | 1/2010 | Swoboda et al. |
| 2010/0139878 A1 | 6/2010 | Nicolucci |
| 2012/0015162 A1 | 1/2012 | Lion et al. |
| 2012/0048450 A1 | 3/2012 | Fu et al. |
| 2012/0100289 A1 | 4/2012 | Egan et al. |
| 2013/0160945 A1 | 6/2013 | Huang et al. |
| 2014/0131367 A1 | 5/2014 | Bordary et al. |

FOREIGN PATENT DOCUMENTS

| | | |
|---|---|---|
| EP | 1216146 B1 | 10/2005 |
| EP | 1634897 A2 | 3/2006 |
| EP | 1674543 A1 | 6/2006 |
| EP | 1780250 A1 | 5/2007 |
| JP | 6313163 A | 11/1994 |
| JP | 09217050 A | 8/1997 |
| JP | 2001207146 A | 7/2001 |
| JP | 2010202996 A | 9/2010 |
| WO | 9014223 A1 | 11/1990 |
| WO | 0200800 A2 | 1/2002 |
| WO | 2005110737 A1 | 11/2005 |
| WO | 2007142593 A1 | 12/2007 |
| WO | 2008084372 A1 | 7/2008 | though

HOT MELT ASSIST WATERBORNE ADHESIVES AND USE THEREOF

FIELD OF THE INVENTION

The present invention relates to a hot melt assist waterborne adhesive. In particular, the hot melt assist waterborne adhesive is suitable as a partial or complete replacement to hot melt adhesives for use in packaging articles. The inventive hot melt assist waterborne adhesive can be extruded with decreased pressure and the adhesive maintains a high amplitude bead profile and fills the gap in between the substrates to form a packaged article.

BACKGROUND OF THE INVENTION

Paper converting and packaging operations require bonding cellulosic sheet, e.g., paperboard or cardboard, together with adhesives. Typically, waterborne or hot melt adhesives are applied onto one or both substrates and the substrates are compressed together to adhere to one another to form cases, cartons, bag handles, agricultural boxes, bulk box laminations, glued laps, and the like.

Hot melt adhesives are favored over waterborne adhesives in certain areas of the paper converting and packaging operations, where high compression cannot be achieved. Extruded hot melt adhesive lines have high amplitude with a bead-like profile that allows the substrates of the paper products to bond together even with the presence of small gaps. The rapid setting nature of the hot melt adhesives also allows for fast and efficient through-put packaging or converting operations. However, drawbacks to hot melt adhesives include low heat resistance, high energy usage, and non-repulpability.

Waterborne adhesives are typically utilized in paper converting and packaging operations where thin adhesive films rather than thick beads are applied, and where solid and lengthy compression can be achieved; however, the waterborne adhesives do not readily "gap-fill" between two uneven substrates such as those from the undulation of corrugated papers. Although increasing the viscosity, in particular the low shear viscosity, of the waterborne adhesives will help to overcome bead sagging problem and thus achieve "gap-fill," the viscous adhesives are difficult to extrude due to their high viscosity. Furthermore, water exits (evaporates) from the viscous waterborne adhesive layers or beads ever so slowly that the through-put of such adhesive is much lower than that of hot melt adhesives.

The present invention improves the shortcomings of conventional waterborne adhesives in paper converting and packaging operations through the use of a waterborne adhesive composition with expanded microspheres. The inventive waterborne adhesive may substitute one or more hot melt adhesive bead lines in paper converting and packaging operations as a hot melt assist adhesive for improved performances.

SUMMARY OF THE INVENTION

The present invention relates to a hot melt assist waterborne adhesive. The present invention provides a replacement of at least one hot melt adhesive line in paper converting and packaging operation that is applied at lower extrusion pressure with high amplitude (bead) profile, maintains the high amplitude, and allows for fast evaporation leading to increased throughput and higher heat resistance. In addition, the application of the hot melt assist waterborne adhesive requires less energy, e.g., heat and pressure than conventional hot melt adhesives and waterborne adhesives.

In a first embodiment, there is provided a hot melt assist waterborne adhesive composition comprising an emulsion polymer, a preservative, water and a plurality of pre-expanded hollow microspheres. The volume fraction of the microspheres in the hot melt assist waterborne adhesive ranges from about 10 to about 40 V/V %. The hot melt assist waterborne adhesive replaces some or all portions of hot melt adhesives for paper converting and packaging operations.

Another embodiment provides an article of manufacture, which is a paperboard bonded to another paperboard with the hot melt assist waterborne adhesive composition including the plurality of pre-expanded hollow microspheres.

Still another embodiment provides a method of joining two substrates together with a hot melt assist waterborne adhesive composition comprising the steps of: (1) preparing the hot melt assist waterborne adhesive composition comprising an emulsion polymer, a preservative, water and a plurality of pre-expanded hollow microspheres, (2) extruding the hot melt assist waterborne adhesive composition onto the first substrate, (3) joining the second substrate onto the adhesive, (4) evaporating the water from the hot melt assist waterborne adhesive composition, whereby the two substrates are joined. The application or the extrusion pressure of the hot melt assist waterborne adhesive comprising the expanded hollow microspheres is less than the application pressure of a conventional waterborne adhesive without the expanded hollow microspheres.

DETAILED DESCRIPTION OF THE INVENTION

Figure 1:
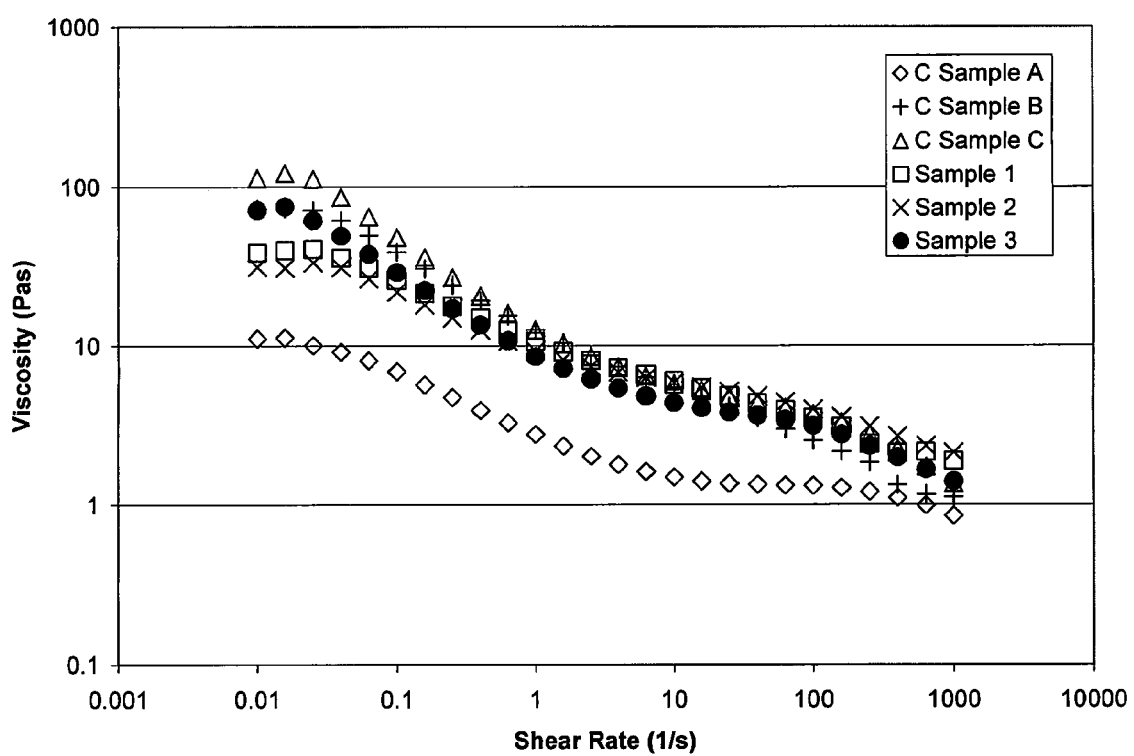
FIG. 1 is a curve of viscosity against shear rate of various adhesives.

Typical waterborne adhesives require significantly longer time to develop adhesion when compared to hot melt adhesives in paper converting and packaging operations. Due to insufficient amplitude height (bead) and evaporation of water in waterborne adhesives, hot melt adhesives are preferred for fast throughput operations.

The present invention provides a hot melt assist waterborne adhesive composition that can partially replace hot melt adhesives. The hot melt assist waterborne adhesive compositions described herein may be useful in traditional paper converting and packaging operations having two paperboard substrates. Through the use of the inventive hot melt assist waterborne adhesive composition, a higher amplitude gap filling adhesive may be provided between the two substrates to which it is attached at the point of adhesion.

The present invention is based on the discovery of a waterborne adhesive composition including a plurality of expandable microspheres for partially or fully replacing hot melt adhesive in paper converting and packaging operation for bonding the paperboard substrates. The high amplitude of the hot melt assist waterborne adhesive gap fills in between the two substrates. As the water evaporates from the hot melt assist waterborne adhesive, adhesion is formed between the two substrates. The resultant adhesive has higher modulus and higher heat resistance than conventional hot melt adhesives and conventional waterborne adhesives.

In a first embodiment, the invention includes a hot melt assist waterborne adhesive composition comprising an emulsion polymer, a preservative, water and a plurality of pre-expanded hollow microspheres.

The hot melt assist waterborne adhesive includes an emulsion polymer having a Tg value of from about −50° C. to about 80° C., preferably from about −20° C. to about 40° C. Exemplary emulsion polymers include polyvinyl alcohol stabilized polyvinyl acetate ethylene dispersion, polyvinyl alcohol stabilized polyvinyl acetate homopolymer, dextrin stabilized polyvinyl acetate, dextrin stabilized ethylene copolymer, vinylacrylic polymer, styrene acrylic polymer, styrene butyl rubber, acrylic polymer, cooked polyvinyl alcohol and mixtures thereof, acrylic monomers, such as 2-ethylhexyl acrylate, butyl acrylate, hexyl ethyl acrylate, methyl methacrylate, and the like. Particularly preferred emulsion polymers for the hot melt assist waterborne adhesive composition include polyvinyl alcohol stabilized polyvinyl acetate ethylene dispersion, polyvinyl alcohol stabilized polyvinyl acetate homopolymer, dextrin stabilized polyvinyl acetate and dextrin stabilized ethylene copolymer.

The solid contents of the emulsion polymer range from about 40 wt % to about 70 wt %.

Useful preservatives in the hot melt assist waterborne adhesive composition include aqueous dispersions of 1-2-benzisothiazolin-3-one or of zinc 2-pyridinethiol-1-oxide. Kathon™ Preservatives (Dow Chemicals), which is a mixture of 5-chloro-2-methyl-4-isothiazolin-3-one and 2-methyl-4-isothiazoline-3-one is also suitable for the hot melt assist waterborne adhesive composition. Preservatives may be used in an amount from about 0.05% to about 1.0% by weight of the hot melt assist waterborne adhesive composition prior to setting of the composition.

The hot melt assist waterborne adhesive composition includes a plurality of pre-expanded microspheres. The microspheres useful in the present invention include, for example, polymeric microspheres, including those having air or hydrocarbon core and a polyacrylonitrile shell (such as those sold under the trade name DUALITE®) and other similar microspheres (such as those sold under the trade name EXPANCEL®). It has been discovered that if the adhesive composition includes too high a concentration of pre-expanded microspheres, there will be insufficient adhesion for the adhesive. However, if there is too low a concentration of the pre-expanded microspheres, the setting time would be prolonged. Therefore, consideration of the loading level must be taken into account when determining the optimal concentration of expanded microspheres in the composition. Preferably, the volume fraction of the microspheres of the hot melt assist waterborne adhesive ranges from about 5 to about 60 V/V %, preferably from about 10 to about 40 V/V %. Depending upon the particular diameter of the pre-expanded microspheres used in the composition, the desired amount of the microspheres in the composition may be modified. If the diameter of the microspheres is small, there may be a higher concentration in the adhesive composition, and conversely, if the diameter of the microspheres is larger, there may be a lower concentration in the adhesive composition.

The expanded microspheres may range in size, including from about 10 microns to about 200 microns in diameter, preferably from about 50 to about 150 microns before fully setting the adhesive.

If desired, expandable microspheres may be added to the hot melt assist waterborne adhesive. To realize the full potential of the expandable microspheres, heat and/or radiation is applied to the adhesive to expand the microspheres.

As can be appreciated by those of skill in the art, the inventive hot melt assist waterborne adhesive composition includes a plurality of expanded microspheres in a fluid emulsion polymer-based adhesive composition. Before the adhesive composition is fully set or cured, these microspheres are able to move within the composition and once the water is driven off the adhesive composition and the adhesive is set, the microspheres are substantially locked in place.

Optional components may be added to modify the hot melt assist waterborne adhesive. Optional components include plasticizers, rheology modifiers, fillers, humectants and defoamers. Useful rheology modifiers are compatible with the emulsion polymer at low shear rate. Exemplary rheology modifiers include alkali swellable emulsion of polyacrylic acid, hydrophobically modified alkali swellable emulsion, acrylic backbone with hydrophobic arms or urethane backbone with hydrophobic arms. Depending on the pH of the emulsion polymer, appropriate rheology modifiers can be selected.

Preferred plasticizer useful in the hot melt assist waterborne adhesive include benzoates, e.g., Benzoflex™ Plasticizer series from Eastman; adipates, e.g., HERCOFLEX® Plasticizer from Ashland; sulfonamides, e.g., Uniplex from Unitex; and the like. Any desirable filler may be used as is known in the art. Humectants useful in the present invention aid in maintaining viscosity stability of the composition, and may include, for example, glycerol, glycerine, urea, propylene glycol, glyceryl triacetate, sugars and sugar polyols such as sorbitol, xylitol, and maltitol, polymeric polyols such as polydextrose, or any other desired composition having humectant properties. Useful defoamers include DEEFO® series (Munzing), FOAMASTER® Formulation Additives series (BASF) and SURFYNOL® Defoamer series (Air Products). The optional components are added in minor amounts, up to about 10 wt % of the hot melt assist waterborne adhesive.

The hot melt assist waterborne adhesive also includes water. In a desired embodiment, prior to setting the composition, the adhesive composition includes water in an amount of about 30% to about 75% by weight of the hot melt assist waterborne adhesive composition, and most desirably from about 40% to about 60% by weight of the composition prior to setting of the composition.

The hot melt assist waterborne adhesive replaces some or all portions of hot melt adhesives for paper converting and packaging operations. Conventional hot melt adhesive is applied in multi-line beads onto a substrate in paper converting and packaging operations. A hot melt adhesive has high initial tack and holds two substrates together, and as the hot melt adhesive cools a bond is formed between the two substrates. The inventive hot melt assist waterborne adhesive can replace at least one of the multi-line beads in paper converting and packaging operation. The paper converting and packaging operations comprising both the conventional hot melt adhesive and inventive hot melt assist waterborne adhesive have higher heat resistance and decreased energy output without decreasing the high through-put of the operation.

In other embodiments, the present invention provides a kit for providing a case or carton having improved heat resistant properties. In this embodiment, the kit includes two parts, a first part and a second part, which are desirably stored in separate vessels. The first part includes a conventional hot melt adhesive. The second part includes a hot melt assist waterborne adhesive composition comprising an emulsion polymer, a preservative, water and a plurality of pre-expanded hollow microspheres. The two adhesives are applied to the substrates of the case or carton and the substrates are bonded together to form the case or carton.

Another embodiment provides a method of joining two substrates together with the inventive hot melt assist waterborne adhesive. A substrate is applied with a conventional hot melt adhesive and the inventive hot melt assist waterborne adhesive. Both adhesives are applied from a tank by means of extrusion or some forced pressure to apply the adhesive from a vessel. In one embodiment, the hot melt assist waterborne adhesive is extruded onto the substrate. The conventional hot melt adhesive and the inventive hot melt assist waterborne adhesive may be applied onto the same substrate or two different substrates, individually or simultaneously. The second substrate is applied onto the adhesives and as the hot melt adhesive cools and the water is evaporated from hot melt assist waterborne adhesive, a bond is formed between the two substrates. The hot melt adhesive gives initial strength and forms a bond as the water from the hot melt assist waterborne adhesive evaporates and sets; and the hot melt assist waterborne adhesive, once set, forms a strong bond with higher modulus and higher heat resistance. Used together, the two adhesives form paperboard articles with improved properties.

Flow rate of the adhesive is a function of pressure, viscosity, the design of the extrusion gun, including the tip. Given identical flow rate, diameter and length of the extrusion head, and substantially similar viscosities of the waterborne adhesives, the extrusion pressure at which the adhesive is applied should be substantially the same. Surprisingly, the inventive hot melt assist waterborne adhesive can be extruded at lower pressure than conventional waterborne adhesive without the microspheres. In some instances, the hot melt assist waterborne adhesive may be extracted at 20%, or even 30% less pressure than its counterpart without the microspheres. As the extruder nozzle becomes smaller, the difference in the extrusion pressure of the waterborne adhesive with the microspheres and the waterborne adhesive without the microspheres becomes more significant.

The high amplitude of the inventive hot melt assist waterborne adhesive is maintained to create a bond between the two substrates, without additional pressure applied onto the substrate. As the water evaporates and the adhesive sets, the bead of the inventive hot melt assist waterborne adhesive remains with effective amplitude to maintain the bond. Moreover, the hot melt assist waterborne adhesive dries faster than conventional waterborne adhesive due to the reduced moisture content. Preferably the hot melt assist waterborne adhesive comprises from about 5 to about 60 V/V %, preferably from about 10 to about 40 V/V % of hollow microspheres in the dried adhesive. Also, the use of the hollow microspheres in the hot melt assist waterborne adhesive resulted in less shrinkage during the setting and evaporation of water. As water evaporated from the adhesive, the adhesive still maintained the amplitude to bond the two substrates together.

The present invention is further related to a paper converting and packaging operation comprising a hot melt assist waterborne adhesive composition comprising an emulsion polymer, a preservative, water and a plurality of expanded hollow microspheres. When used in conjunction with a hot melt adhesive, as a hot melt assist waterborne adhesive, the manufacturing throughput remains high with lower energy consumption.

The heat resistance of the inventive hot melt assist waterborne adhesive is higher than conventional hot melt adhesives. Conventional hot melt adhesives have a heat resistance value of about 125° F. to about 150° F. Paperboard sealed with the inventive hot melt assist waterborne adhesive can maintain the bond at elevated temperature even if the bond from the hot melt adhesive fails. The inventive hot melt assist waterborne adhesive surpasses heat resistance of 280° F.

Conventional hot melt adhesive and inventive hot melt assist waterborne adhesive may be used in paper converting and packaging operations to bond cellulosic sheet, e.g., paperboard or cardboard, to manufacture cases, cartons, bag handles, agricultural boxes, bulk box laminations, glued laps, and the like. Such articles have improved adhesion, heat resistance, lower shrinkage over conventional articles without the microspheres in the waterborne adhesive. In fact, lower grade hot melt adhesives can be used in conjunction with the inventive hot melt assist waterborne adhesive to minimize cost while maintaining the high throughput for case and paper converting and packaging processes.

The present invention may be better understood through analysis of the following examples, which are non-limiting and are intended only to help explain the invention.

EXAMPLES

Example 1

Hot Melt Assist Waterborne Adhesives Components

Each hot melt assist waterborne adhesive was made by combining the components in Table 1 and then stirring for about an hour or until the mixture became homogeneous.

TABLE 1

| Components | C Sample A | C Sample B | C Sample C | Sample 1 | Sample 2 | Sample 3 | Sample 4 |
|---|---|---|---|---|---|---|---|
| Poly vinyl acetate ethylene | 50 | 42.5 | 49.88 | 47.38 | 48.62 | 46.34 | |
| polyvinyl acetate | 50 | 42.5 | 49.88 | 47.38 | 48.62 | 46.34 | 83.06 |
| plasticizer | | | | | | | 9.62 |
| rheology modifier | | | 0.25 | | | 0.30 | 0.30 |
| CaCO3 filler | | 15.0 | | | | | |
| microsphere 135 micron (wet) | | | | | | 3.05 | 3.05 |
| microsphere 55 micron (dry) | | | | 4.99 | | | |
| microsphere 135 micron (dry) | | | | | 2.49 | | |
| preservative | | | | 0.13 | 0.13 | 0.12 | 0.12 |
| defoamer | | | | 0.13 | 0.13 | 0.12 | 0.12 |
| water | | | | | | 3.73 | 3.73 |
| Microsphere Volume % | N/A | N/A | N/A | 30% | 30% | 25% | 25% |

Example 2

Rheology Verses Shear Rate

The rheologies of the above samples were measured against the shear rate, and shown in FIG. 1. Comparative Sample A had the lowest viscosity and therefore had the poorest bead amplitude. The addition of fillers (Comparative Sample B), rheology modifiers (Comparative Sample C), or pre-expanded microspheres (Sample 1, 2, and 3) increased the viscosities of the adhesive. Comparative Samples B and C and samples 1-3 have a reasonable bead amplitude to provide the gap filling properties. Comparative Sample B is not extrudable because the abrasive fillers would damage the extrusion equipment. Comparative Sample C had higher viscosity at lower shear rate than Samples 1-3. Samples 1-3 had acceptable profiles at various shear rates.

Example 3

Dry Bead Height

The dry bead height of each sample was measured. Various add-on levels (Win) of the adhesive was placed on a substrate, dried fully and the amplitude (height) of the bead was measured. For comparison purpose, Henkel's Technomelt SUPRA® 100 hot melt was applied at 0.04 g/in and the height of the cooled bead was measured to be about 1 mm. The dry heights and the add-on levels are shown in FIG. 2.

Figure 2:
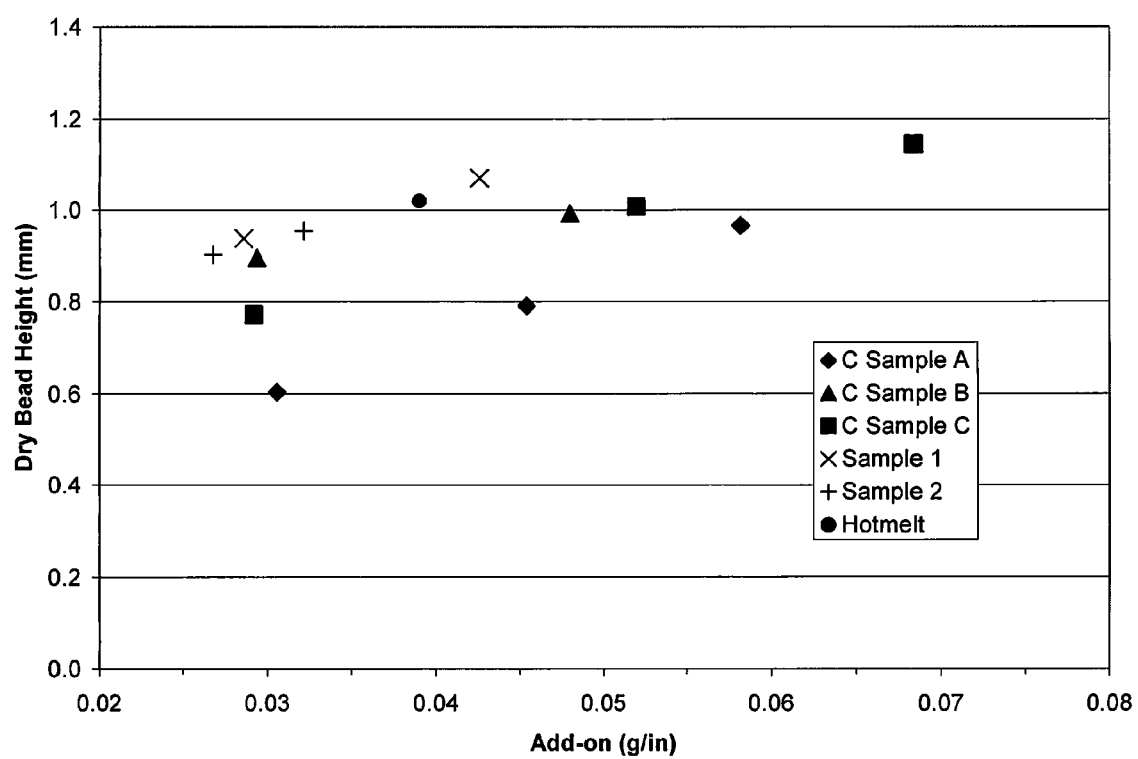
FIG. 2 is a curve of dry bead height verses add-on of various adhesives.

FIG. 2 shows that conventional waterborne adhesives such as Comparative Sample A have relatively low dry bead height even at 0.06 g/in add-on levels. While Comparative Sample C had higher viscosity at the tested shear rate, thickening the waterborne adhesive with a rheology modifier failed to form similar height as that of a hot melt adhesive. The addition of fillers in the waterborne adhesive (Comparative Sample B) increased the dry bead height to levels similar to the hot melt amplitude. Also, the addition of microspheres in the waterborne adhesives, Samples 1 and 2, resulted in similar dry bead heights at similar add-on levels. Samples 1-3 had sufficient amplitude to gap fill between the substrates and form a bond.

Example 4

Semi-Wet Strength

The semi-wet strengths of the adhesive samples were measured with a Texture Analyzer. About 12 mg of each sample was applied as a bead onto a substrate. A second substrate was applied onto the sample adhesive and compressed to a 10 mil gap and dried for five minutes. The substrates were pulled apart at a 0.2 mm/sec using a tensile mode until the bond failed. The gap and the amount of force at the bond failure were measured and recorded in Table 2. For Sample 1, the volume percent was varied, as shown in Table 2, by adjusting the amount of microspheres.

TABLE 2

|  | V/V % (microspheres) | Gap (mm) | Force (g) |
| --- | --- | --- | --- |
| Comparative Sample A | 0 | 0.4 | 380 |
| Comparative Sample B | 0 | 0.6 | 700 |
| Comparative Sample C | 0 | 0.3 | 600 |
| Sample 1 | 20% | 1.0 | 900 |
| Sample 1 | 30% | 0.7 | 650 |
| Sample 1 | 40% | 0.5 | 500 |
| Sample 2 | 30% | 0.7 | 800 |

The bonds formed with the comparative samples failed at smaller gaps and lower force than Sample 1, 20% V/V and Sample 2, 30% V/V. The addition of microspheres resulted in better adhesion, faster bond formation and semi-wet strength of the adhesive. The semi-wet strength is only realized when the microspheres are added in small addition, below 40 V/V %. Increasing the microsphere content to 40 V/V % and above, decreases the wet bond strength of the adhesive.

Example 5

Extrusion Pressure

Comparative Sample C and Sample 3 were extruded and their extrusion pressures were obtained. Both adhesives were applied with the extruder, Valco MCP-4 W/EPC controller with Valco Model 524 Extrusion gun with 0.7 nozzle, with a flow adjustment (stroke). To mimic the same volume of hot melt adhesive bead lines, the flow rate was first determined of the hot melt adhesive (Henkel Technomelt SUPRA® 100). The same flow rate was obtained for each of the adhesives listed in Table 3 by changing the extrusion pressure. The viscosities of both Comparative Sample C and Sample 3 are similar, as shown in FIG. 1, and thus would be expected that the applied extrusion pressure of both adhesives would be substantially similar. Surprisingly, the application of the Sample 3 adhesive, with the microspheres, required significantly less extrusion pressure than Comparative Sample C adhesive, without any microspheres.

TABLE 3

| Stroke Adjustment | Comparative Sample C (psi) | Sample 3 (psi) |
| --- | --- | --- |
| ½ turn | 112 | 80 |
| ⅜ turn | 285 | 150 |

As the stroke adjustment of the extruder decreased, the extrusion pressure increased for both samples, but the increased pressure was lower for the sample with the microspheres. As the stroke adjustment decreased, the difference in the extrusion pressure increase becomes more significant.

Example 6

Observation of the Extruded Bead Lines

Comparative Sample C and Sample 3 were extruded onto a paperboard with extruder, Valco MCP-4 W/EPC controller with Valco Model 524 Extrusion gun with 0.7 nozzle. An ideal adhesive will form a bead line that is parallel to the direction to which it is applied to and having the same width throughout the entire bead line. Sample 3 was extruded and formed a bead line parallel to the direction of the extrusion and the bead width remained substantially the same throughout the entire bead line, without much shrinkage. On the other hand, Comparative Sample C did not form a width that is substantially the same throughout the bead line. Some portions of this Comparative Sample had more significant shrinkage than Sample 3. The bead line was thicker in some portions and thinner in different parts of the bead line for Comparative Sample C. Furthermore, the bead did not taper off cleanly, and some pulled to a perpendicular direction. To form a parallel bead line for the comparative sample, higher extrusion pressure was required for the Comparative Sample C than Sample 3.

Example 7

Heat Resistance

Figure 3:
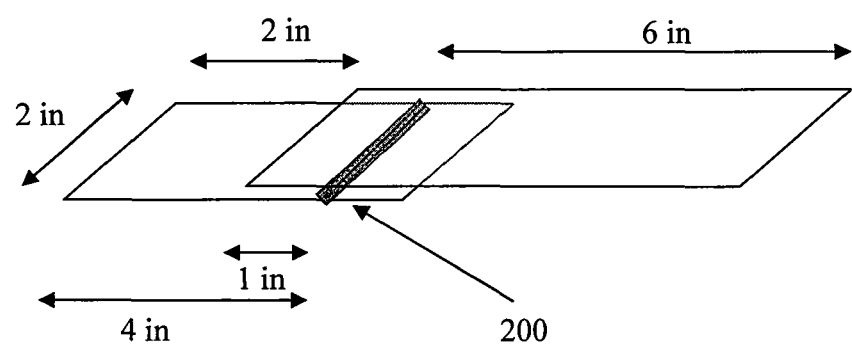
FIG. 3 is a test vehicle for measuring adhesive heat resistance.
Figure 3:
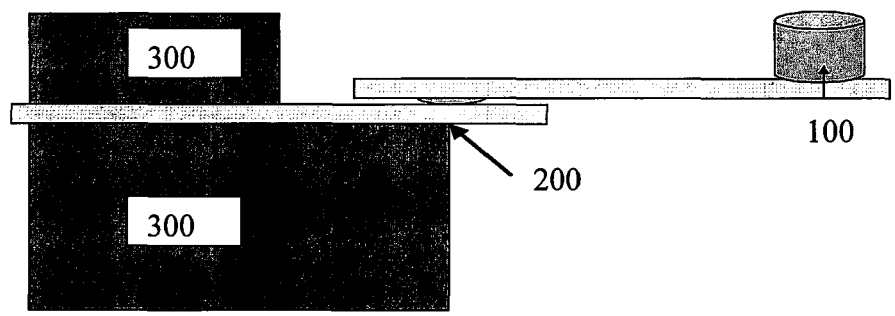

To measure the heat resistance of the inventive hot melt assist waterborne adhesive, Sample 3 was tested in a vehicle shown in FIG. 3. Six samples were made and tested. Sample 3 was extruded onto a bottom substrate with bead weight range from 0.05 to 0.1 g, and a top substrate was applied onto the adhesive. A two hundred gram block weight was applied directly on the bond for 2-3 seconds. After setting, the articles were clamped (300) on one side, and the entire articles were placed in a controlled oven with a three hundred gram weight (100) at the end of the 6 inch substrate (the non-bonded end) for 24 hours, as shown in FIG. 3B. This test was repeated at 5° F. intervals, starting at 150° F., with new set of samples. The bond (200) was deemed to pass the heat resistance test if the weight did not break the bond at the set temperature. Typical hot melt adhesives fail at 125° F. to about 150° F. Articles made with Sample 3 surpassed 285° F.

What is claimed:

1. A hot melt assist waterborne adhesive composition comprising:
   a) an emulsion polymer that has a Tg value of from about -50° C. to about 80° C. selected from the group consisting of polyvinyl alcohol stabilized polyvinyl acetate ethylene dispersion, polyvinyl alcohol stabilized polyvinyl acetate homopolymer, dextrin stabilized polyvinyl acetate, dextrin stabilized ethylene copolymer, cooked polyvinyl alcohol and mixture thereof;
   b) a preservative;
   c) a plurality of pre-expanded microspheres; and
   d) water,
wherein the microspheres have a volume fraction ranging from about 10 to 40V/V% based on the total volume of the adhesive.

2. The hot melt assist waterborne adhesive composition of claim 1, wherein the emulsion polymer is polyvinyl alcohol stabilized polyvinyl acetate ethylene dispersion, polyvinyl alcohol stabilized polyvinyl acetate homopolymer, dextrin stabilized polyvinyl acetate or dextrin stabilized ethylene copolymer.

3. The hot melt assist waterborne adhesive composition of claim 1 wherein the pre-expanded microspheres have a polymeric shell and have a diameter of from about 50 to about 150 microns.

4. The hot melt assist waterborne adhesive composition of claim 1 wherein the volume fraction ranges from about 20 to 30 V/V %.

5. The hot melt assist waterborne adhesive composition of claim 1 further comprising a plasticizer, rheology modifier, humectant, defoamer and mixtures thereof.

6. An article comprising at least two substrates, a hot melt adhesive and a hot melt assist waterborne adhesive composition comprising (a) at least one emulsion polymer that has a Tg value of from about -50° C. to about 80° C. selected from the group consisting of polyvinyl alcohol stabilized polyvinyl acetate ethylene dispersion, polyvinyl alcohol stabilized polyvinyl acetate homopolymer, dextrin stabilized polyvinyl acetate, dextrin stabilized ethylene copolymer and mixtures thereof; (b) a preservative; (c) a plurality of pre-expanded microspheres; and (d) water, wherein the microspheres have a volume fraction ranging from about 10 to 40VN% based on the total volume of the hot melt assist waterborne adhesive.

7. The article of claim 6 wherein the substrates are paper or paperboard.

8. The hot melt assist waterborne adhesive composition of claim 6 wherein the pre-expanded microspheres have a polymeric shell and have a diameter of from about 20 to about 200 microns.

9. The hot melt assist waterborne adhesive composition of claim 6 wherein the volume fraction ranges from about 20 to 30 V/V %.

10. The hot melt assist waterborne adhesive composition of claim 6 further comprising a plasticizer, rheology modifier, humectant, defoamer and mixtures thereof.

11. The article of claim 6 which is a case, carton, bag handle, agricultural box, bulk box lamination or glued lap.

12. A method of sealing a case or carton having at least two substrates, comprising the steps of:
   (1) preparing a hot melt assist waterborne adhesive comprising (a) at least one emulsion polymer that has a Tg value of from about -50° C. to about 80° C.; (b) a preservative; (c) a plurality of pre-expanded microspheres; and (d) water;
   (2) extruding the hot melt assist waterborne adhesive onto a substrate, wherein the extrusion pressure is at least 20% less than extruding a waterborne adhesive without the plurality of pre-expanded microspheres;
   (3) applying a hot melt adhesive onto a substrate;
   (4) applying a second substrate onto the substrate and
   (5) evaporating the water from the hot melt assist waterborne adhesive;
whereby the two substrates form a bond.

13. The method of claim 12 wherein steps 2 and 3 are performed simultaneously.

14. The method of claim 12 wherein both the hot melt assist waterborne adhesive and the hot melt adhesive are applied onto the same substrate.

15. The method of claim 12 wherein the hot melt assist waterborne adhesive is applied onto a first substrate and the hot melt adhesive is applied onto a second substrate.

16. The method of claim 12 wherein the volume fraction of the hot melt assist waterborne adhesive ranges from about 20 to 30 V/V %.

17. The method of claim 12 wherein the extrusion pressure of the hot melt assist waterborne adhesive is 40% less than a waterborne adhesive without the plurality of pre-expanded microspheres.

* * * * *